United States Patent [19]
Sato et al.

[11] Patent Number: 4,477,155
[45] Date of Patent: Oct. 16, 1984

[54] PHOTOGRAPHIC LENS OF THE PARTIAL FOCUSING TYPE

[75] Inventors: Yasuhisa Sato; Hideo Yokota, both of Kanagawa; Yasuyuki Yamada, Tokyo, all of Japan

[73] Assignee: Canon Kabushiki Kaisha, Tokyo, Japan

[21] Appl. No.: 448,807

[22] Filed: Dec. 10, 1982

[30] Foreign Application Priority Data

Dec. 21, 1981 [JP] Japan .................................. 56-207680

[51] Int. Cl.³ .................................................. G02B 9/34
[52] U.S. Cl. ...................................... 350/469; 350/432; 350/428
[58] Field of Search ................ 350/469, 423, 427, 428, 350/430, 432

[56] References Cited
U.S. PATENT DOCUMENTS 4,124,276 11/1978 Okano et al. .......................... 350/469
4,413,888 11/1983 Sato ....................................... 350/469

Primary Examiner—John K. Corbin
Assistant Examiner—P. M. Dzierzynski
Attorney, Agent, or Firm—Toren, McGeady and Stanger

[57] ABSTRACT

A photographic lens having four components of characteristic forms with the 1st component counting from front being axially moved forward while the 2nd component is moved axially in a given relation to the 1st component as focusing is effected down to shorter object distances.

3 Claims, 39 Drawing Figures

FIG.1a
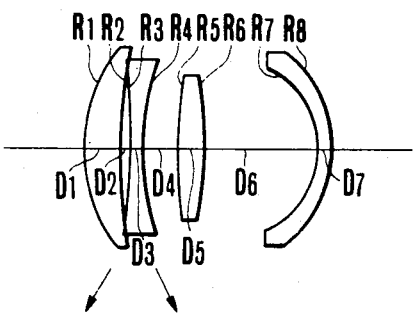
FIG.1b1
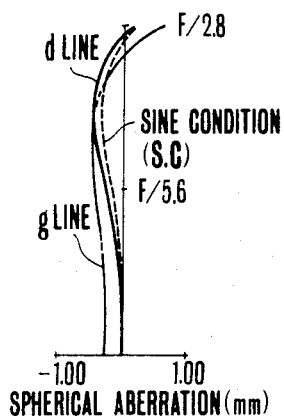
SPHERICAL ABERRATION (mm)
FIG.1b2
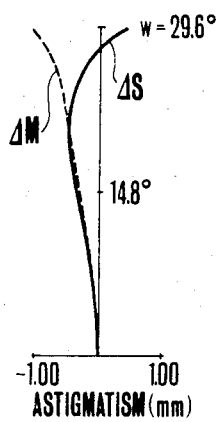
ASTIGMATISM (mm)
FIG.1b3
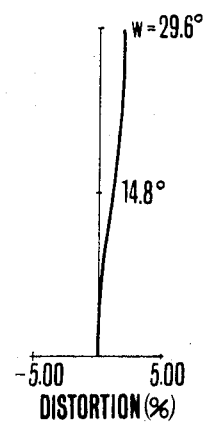
DISTORTION (%)
FIG.1c1
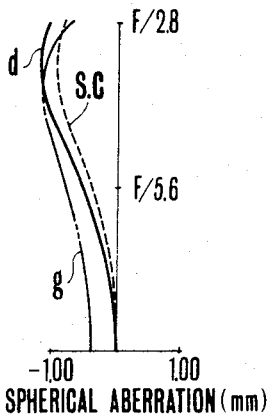
SPHERICAL ABERRATION (mm)
FIG.1c2
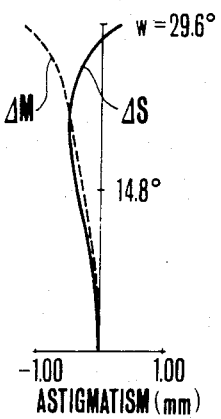
ASTIGMATISM (mm)
FIG.1c3
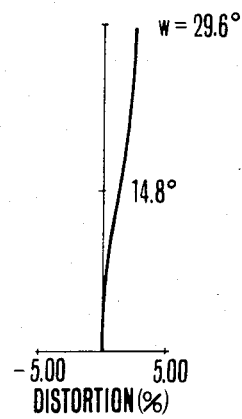
DISTORTION (%)

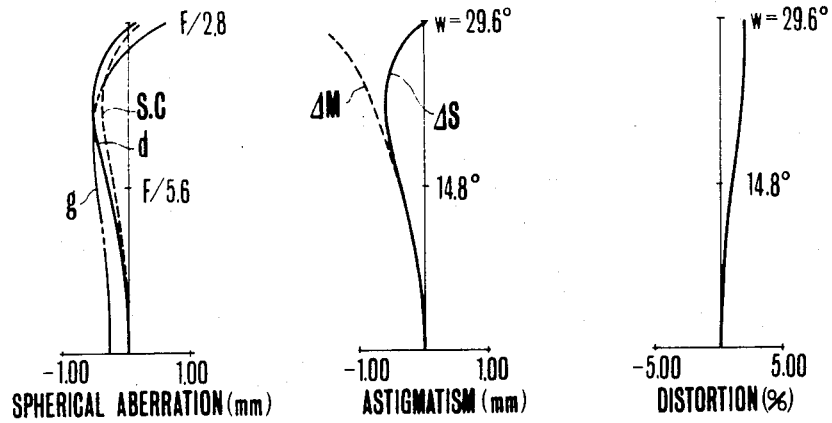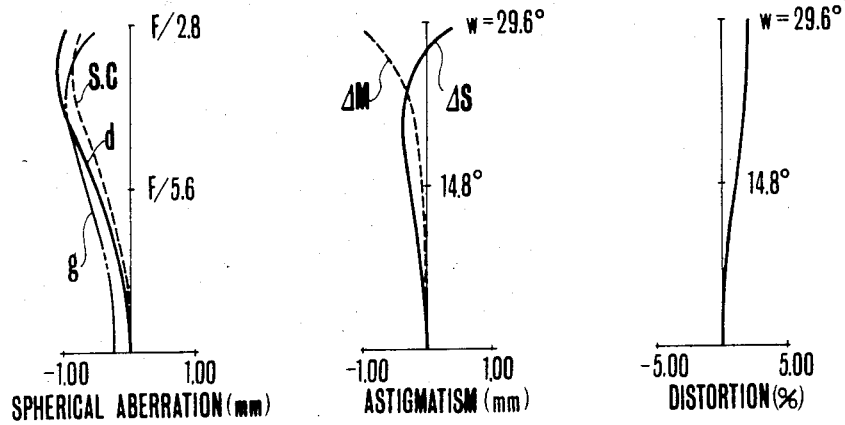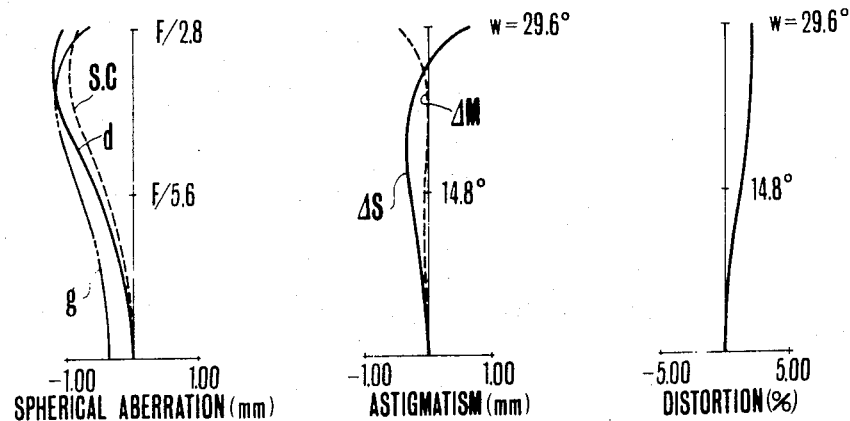

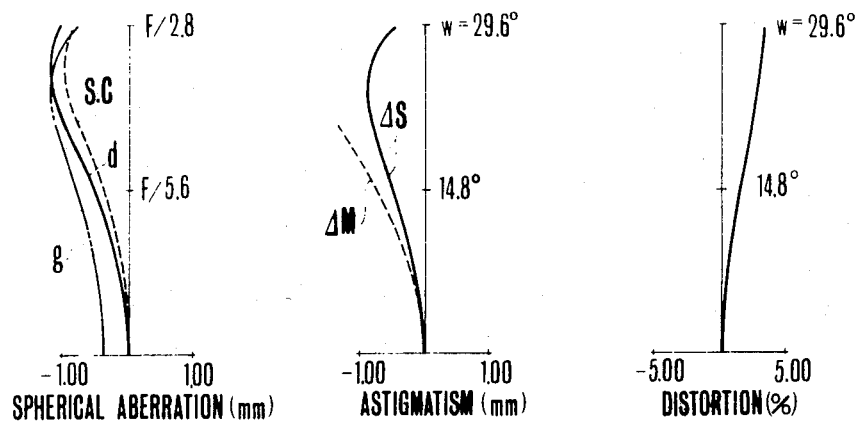
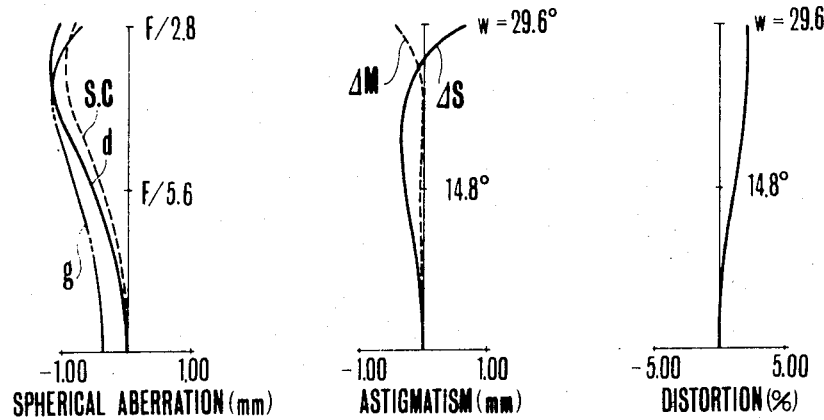
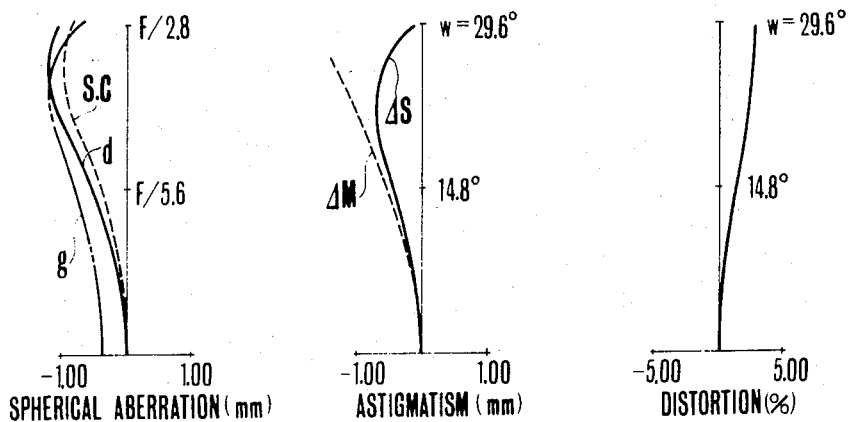

FIG.5a
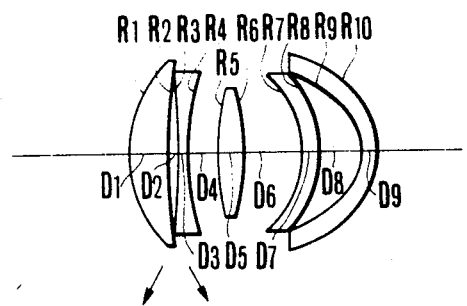
FIG.5b1 FIG.5b2 FIG.5b3
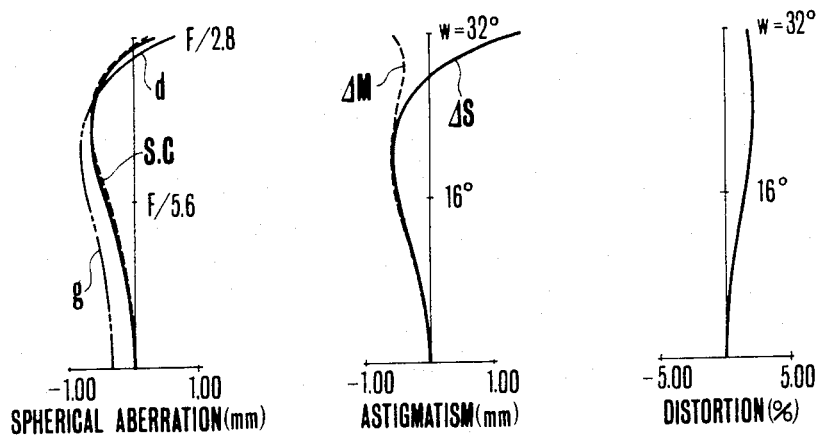
FIG.5c1 FIG.5c2 FIG.5c3
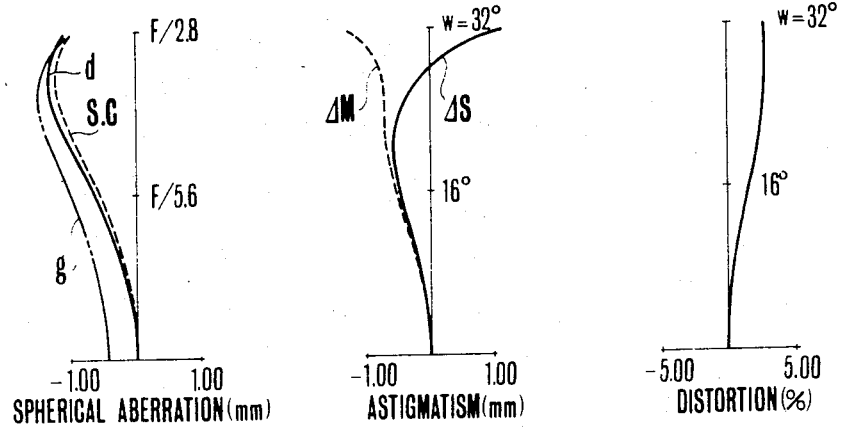

FIG.6a
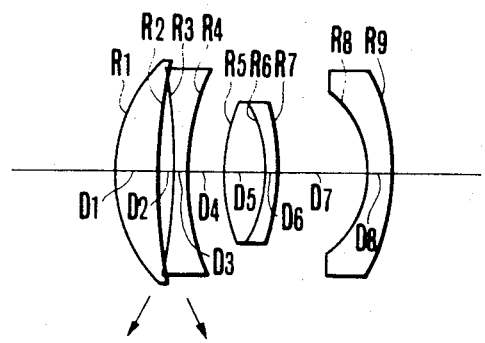
FIG.6b1  FIG.6b2  FIG.6b3
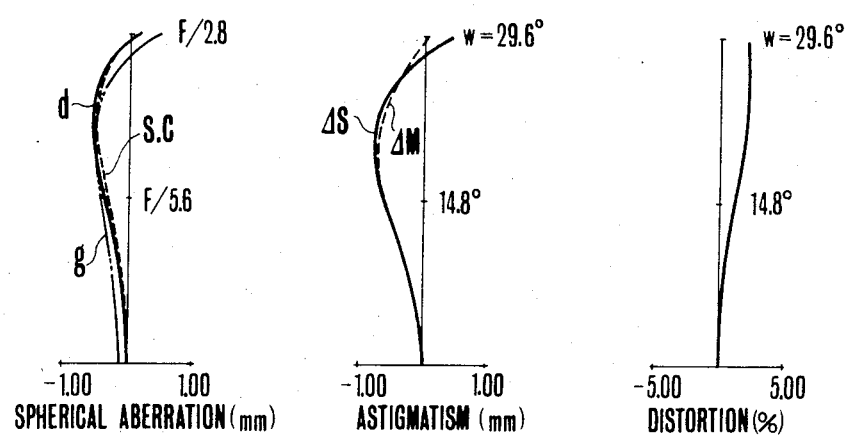
FIG.6c1  FIG.6c2  FIG.6c3
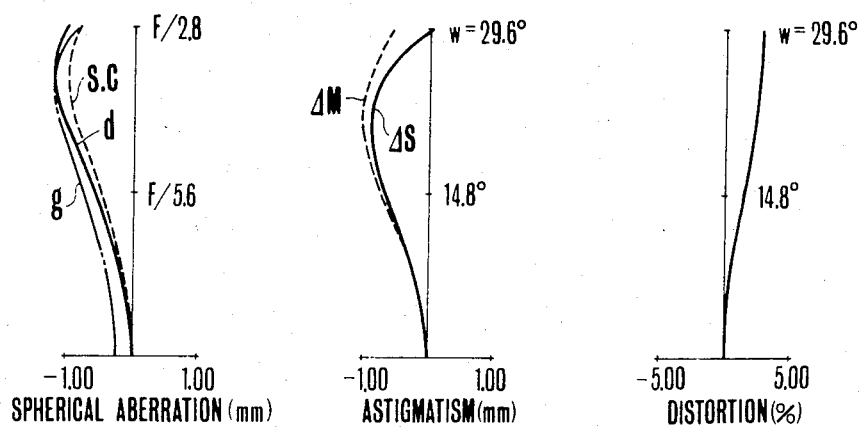

PHOTOGRAPHIC LENS OF THE PARTIAL FOCUSING TYPE

BACKGROUND OF THE INVENTION

1. Field of the Invention

This invention relates to photographic lenses of the partial focusing type having a high relative aperture and a widened image angle while still permitting the total length of the lens system to be reduced to compactness, and more particularly to 4-component photographic lenses of the partial focusing type.

2. Description of the Prior Art

Recently, as the trend of reducing the size of photographic cameras prevails, there is an increasing demand for compact photographic lenses of short total length. In order to design a lens having a smaller ratio of the distance from the front vertex to the focal plane to the focal length (or smaller telephoto ratio) than unity, it is desirable to employ the lens type that the front assembly is of positive power and the rear assembly is of negative power, or the so-called telephoto type. The telephoto type of lens is, however, not much suited to increase the field angle. Another recent trend is that the auto-focus cameras are finding wider acceptance in various fields of activity. To achieve accurate and quick and easy automatic focusings, it is preferred to select a lens group which is small in the number of members and light in weight for employment in focusing.

Under such situations, it is now strongly required to make the focusing provision at part of the lens system which allows for the employment of the telephoto type to achieve a minimization of the bulk and size of the lens sytem and an increase of the angular field coverage.

In the past, such partial focusing method employed in the photographic lens was by moving the first three lens components counting from the front as a unit as proposed in Japanese Laid-Open Patent No. Sho 56-91206.

The movement of the 3 lens components in unison, however, tended to change spherical aberration and field curvature in opposite directions to each other as focusing is performed. In more detail, as focusing is effected down to shorter object distances, the spherical aberration is progressively more under-corrected, while the field curvature is progressively more over-corrected. Upon consideration to a high grade imagery over the entire area of the film frame, such opposition of the directions of change of the spherical aberration and field curvature with focusing cannot be said to be rather preferable.

As other photographic lenses of the partial focusing type mention may be made of U.S. Pat. Nos. 3,695,750 and 3,762,801.

SUMMARY OF THE INVENTION

It is an object of the present invention to provide a photographic lens of the partial focusing type which is well corrected for various aberrations.

To achieve this object, one of the features of the invention is the construction and arrangement of the lens components with, from front to rear, the 1st component of positive power in the meniscus form of forward convexity, the 2 nd component of negative power, the 3rd component of positive power and the 4th component consisting of one or more lens elements and having a negative power as a whole, whereby when focusing is effected down to shorter object distances, the 1st component is axially moved forward, while simultaneously the 2nd component is axially moved rearward in a given relation to the 1st component.

BRIEF DESCRIPTION OF THE DRAWINGS

FIGS. 1-a, 5-a and 6-a are lens block diagrams of embodiments 1, 2 and 3 of the present invention respectively.

FIGS. 1-b-1 to 3 and 1-c-1 to 3 are graphic representations of the various aberrations of the lens of FIG. 1-a with an object at infinity and at a distance of 50f (where f is the focal length) respectively.

FIGS. 2-a-1 to 3, FIGS. 2-b-1 to 3, FIGS. 3-a-1 to 3 and FIGS. 3-b-1 to 3 are graphic representations of the lens of FIG. 1-a with three different examples of modification of the focusing arrangement such that for an object at a shorter distance, the lens is moved forward as a whole, the 1st to 3rd components are moved forward in unison, the 1st component is moved forward alone, and the 2nd component is moved rearward alone, respectively.

FIGS. 4-a-1 to 3 and FIGS. 4-b-1 to 3 are graphic representations of the various aberrations of the lens of FIG. 1-a when formula (1) to be described later is taken at a value of 1 and 3 respectively.

FIGS. 5-b-1 to 3 and FIGS. 5-c-1 to 3 are graphic representations of the various aberrations of the lens of FIG. 5-a with an object at infinity and at a short distance respectively.

FIGS. 6-b-1 to 3 and FIGS. 6-c-1 to 3 are graphic representations of the various aberrations of the lens of FIG. 6-a with an object at infinity and at a short distance.

DETAILED DESCRIPTION OF THE PREFERRED EMBODIMENTS

With the photographic lens employing the focusing method of the invention, when focused on an object at a shorter distance, the spherical aberration is varied in a direction to be under-corrected, and at the same time the field of curvature is varied in a direction also to be under-corrected, thereby it being made possible to maintain good balance of image quality throughout the entire region of the film.

This reason should be explained in connection with embodiments of the present invention.

In FIG. 1-a, FIGS. 1-b-1 to 3 and FIGS. 1-c-1 to 3, there are shown an embodiment 1 of the 4-component photographic lens and changes of the various aberrations of that lens with focusing from infinity to a distance of about 50 times the focal length (hereinafter referred to as "50f") according to the present invention. The changes of the various aberrations resulting from otherwise focusing by moving the whole lens are shown in FIGS. 2-a-1 to 3. It is evident from comparison of the various aberrations of FIGS. 1-c-1 to 3 to those of FIGS. 2-a-1 to 3 that when the lens is bodily moved forward to effect focusing down to shorter object distances, the ranges of variation of the spherical aberration and field curvature are lessened.

This is also proven by the aberration coefficients. Table I-(1) lists Seidel's 3rd order aberration coefficients of the lens when bodily moved forward to effect focusing at a distance of 50f.

For reference, the 3rd order Seidel aberration coefficients of the same lens but when focused to the distance of 50f by moving the 1st to 3rd components in unison are given in Table I-(2). Also the resultant aberration curves are illustrated in FIGS. 2-*b*-1 to 3. This focusing method by moving the three components results in under-correction of spherical aberration and over-correction of field curvature as is evident from the aberration curves of FIGS. 2-*b*-1 to 3. Also upon comparison of the aberration coefficients I and III in Tables I-(1) and (2), the use of the 3-component focusing method provides a larger value of spherical aberration coefficient I which implies the tendency toward more under-correcting and a smaller value of astigmatic aberration coefficient III which implies the tendency toward lesser under-correcting. Thus, how the aberrations change in actual practice can be read from the numerical data of the variation of the aberration coefficients.

Next, Table II-(1) lists the values of aberration coefficients of the same lens when focused by the 1st component only. From this it is evident that the spherical aberration is under-corrected, and the field curvature is over-corrected. The resultant aberration curves are illustrated in FIGS. 3-*a*-1 to 3. Table II-(2) lists the values of aberration coefficients of the same lens when focused by the 2nd component only. It is evident that the spherical aberration is under-corrected, and the field curvature is also too under-corrected. The resultant aberration curves are illustrated in FIGS. 3-*b*-1 to 3.

From the foregoing results, it may be concluded that the balance of spherical aberration and field curvature can be maintained excellent by moving the 1st and 2nd components simultaneously in a suitable ratio of speeds thereof. Table II-(3) lists the values of aberration coefficients taken when the 1st and 2nd components are moved forward and rearward respectively in a speed ratio of 2:1. From this table, it is evident that not only the spherical aberration but also the field curvature changes in a direction to be under-corrected with a lesser range of variation of the field curvature than when the 2nd component only is used in focusing. FIGS. 1-*c*-1 to 3 are the aberration curves obtained by the ray-tracing when the focusing method of the invention is employed. As is expected from the values of aberration coefficients, the spherical aberration and field curvature change in the same direction to good balance.

Now letting $\Delta 1$ and $\Delta 2$ denote the amounts of movement of the 1st and 2nd components respectively, for the image aberrations as well corrected to good balance as focusing is effected down to shorter object distances, it is preferred to satisfy the following condition:

$$0.5 < |\Delta 2/\Delta 1| < 3.5 \quad (1)$$

When the lower limit of inequalities (1) is exceeded, as focusing is effected down to shorter object distances, the spherical aberration changes in a direction to be undercorrected, and the field curvature to be over-corrected, thus deteriorating the balance of the image aberrations badly. When the upper limit is exceeded, the spherical aberration and the field curvature are both under-corrected, with the field curvature becoming too under-corrected, thus deteriorating the balance of the image aberrations. In the lens of embodiment 1, the aberration curves with $|\Delta 2/\Delta 1| = 1$ are depicted in FIGS. 4-*a*-1 to 3, and $|\Delta 2/\Delta 1| = 3$ in FIGS. 4-*b*-1 to 3. As is evident from FIGS. 4-*a*-1 to 3 and FIGS. 4-*b*-1 to 3, the field curvature takes a value almost near the boundary between the directions of over- and under-corrections.

It should be pointed out here that in the embodiments of the photographic lens according to the present invention, the high grade imaging performance can be further improved when an aspheric surface is applied to one of the lens surfaces in the 4th component. Thereby the image quality in the marginal zone of the picture format can be heightened.

Examples of specific lenses of the invention can be constructed in accordance with the numerical data given in the following tables for the radii of curvature, R, the lens thicknesses and air separations, D, and the refractive indices and Abbe numbers of the glasses of the lens elements, N and $\nu$ respectively, with the subscripts numbered from front to rear.

The aspheric surface is expressed in the co-ordinate with an X-axis in an optical axis of the lens, a Y-axis in a direction perpendicular to the optical axis and an original point at the intersection of the vertex of the lens and the X-axis, and taking the direction in which light proceeds as positive by an equation for the difference $\Delta X$ from a spherical surface which contributes to determine the focal length in the directions of X-axis:

$$\Delta X = \frac{(1/R^*)Y^2}{1 + \sqrt{1 - (Y/R^*)^2}} + a1Y^2 + a2Y^4 + a3Y^6 + \ldots + b1Y^3 + b2Y^5 + \ldots - \frac{(1/R)Y^2}{1 + \sqrt{1 - (Y/R)^2}}$$

where R is the radius of curvature of the paraxial region; R* is the radius of curvature of the reference spherical surface defined by $R = 1/(1/R^* + 2a1)$; and ai and bi are aspheric even and odd coefficients respectively.

TABLE I

| | Seidel's 3rd order aberration coefficients with different focusing methods | |
|---|---|---|
| | (1) Forward Movement As a Whole | (2) Forward Movement of 1st to 3rd Components |
| I | 2.649 | 2.867 |
| II | 0.329 | 0.131 |
| III | 0.406 | 0.402 |
| P | 0.169 | 0.169 |
| V | −0.128 | −0.139 |

TABLE II

| | Seidel's 3rd order aberration coefficients with different focusing methods | | |
|---|---|---|---|
| | (1) Forward Movement of 1st Component | (2) Rearward Movement of 2nd Component | (3) Present Invention |
| I | 2.892 | 2.882 | 2.888 |
| II | 0.149 | 0.169 | 0.156 |
| III | 0.396 | 0.455 | 0.415 |
| P | 0.169 | 0.169 | 0.169 |
| V | −0.155 | −0.226 | −0.179 |

I: 3rd order spherical aberration coefficient
II: 3rd order comatic aberration coefficient
III: 3rd order astigmatic aberration coefficient
P: Petzval Sum
V: 3rd order distortional aberration coefficient

| Embodiment 1 | | | |
|---|---|---|---|
| F = 100 | FNo. 1:2.8 | $2\omega = 59°$ | |
| R1 = 32.28 | D1 = 8.24 | N1 = 1.77250 | $\nu 1$ = 49.6 |

-continued

Embodiment 1

F = 100    FNo. 1:2.8    2ω = 59°

| | | | |
|---|---|---|---|
| R2 = 103.01 | D2 = 2.56 | | |
| R3 = −158.50 | D3 = 2.63 | N2 = 1.76182 | ν2 = 26.6 |
| R4 = 53.21 | D4 = 7.83 | | |
| R5 = 116.56 | D5 = 5.56 | N3 = 1.80610 | ν3 = 40.9 |
| R6 = −98.74 | D6 = 25.19 | | |
| R7* = −19.38 | D7 = 3.16 | N4 = 1.49171 | ν4 = 57.4 |
| R8 = −27.27 | | | |

Aspheric Coefficients for the 7th Surface

| | |
|---|---|
| a1 = −2.267 × 10$^{-4}$ | b1 = −2.668 × 10$^{-5}$ |
| a2 = 6.919 × 10$^{-6}$ | b2 = −6.168 × 10$^{-7}$ |
| a3 = 1.289 × 10$^{-8}$ | b3 = 3.376 × 10$^{-9}$ |
| a4 = −1.819 × 10$^{-10}$ | b4 = −4.863 × 10$^{-12}$ |
| a5 = 4.769 × 10$^{-13}$ | |

Embodiment 2 f = 100    FNo. = 1:2.8    2ω = 64°

| | | | |
|---|---|---|---|
| R1 = 31.41 | D1 = 9.19 | N1 = 1.77250 | ν1 = 49.6 |
| R2 = 123.34 | D2 = 2.40 | | |
| R3 = −202.65 | D3 = 2.46 | N2 = 1.84666 | ν2 = 23.9 |
| R4 = 61.34 | D4 = 7.85 | | |
| R5 = 94.76 | D5 = 5.16 | N3 = 1.59270 | ν3 = 35.3 |
| R6 = −79.92 | D6 = 15.22 | | |
| R7 = −23.57 | D7 = 3.48 | N4 = 1.49171 | ν4 = 57.4 |
| R8 = −27.52 | D8 = 10.71 | | |
| R9* = −18.69 | D9 = 3.48 | N5 = 1.49171 | ν5 = 57.4 |
| R10 = −23.55 | | | |

Aspheric Coefficients for the 9th Surface

| | |
|---|---|
| a1 = −2.959 × 10$^{-3}$ | b1 = 5.234 × 10$^{-6}$ |
| a2 = −1.039 × 10$^{-5}$ | b2 = 2.228 × 10$^{-6}$ |
| a3 = −1.736 × 10$^{-7}$ | b3 = −1.146 × 10$^{-8}$ |
| a4 = 2.426 × 10$^{-9}$ | b4 = −1.286 × 10$^{-10}$ |
| a5 = 2.268 × 10$^{-12}$ | |

Embodiment 3 f = 100    FNo. = 1:2.8    2ω = 59°

| | | | |
|---|---|---|---|
| R1 = 33.024 | D1 = 9.57 | N1 = 1.77250 | ν1 = 49.6 |
| R2 = 104.343 | D2 = 3.58 | | |
| R3 = −152.135 | D3 = 3.16 | N2 = 1.80518 | ν2 = 25.4 |
| R4 = 53.801 | D4 = 8.50 | | |
| R5 = 46.074 | D5 = 8.68 | N3 = 1.56732 | ν3 = 42.8 |
| R6 = −30.541 | D6 = 2.63 | N4 = 1.80610 | ν4 = 40.9 |
| R7 = −51.693 | D7 = 19.70 | | |
| R8* = −20.103 | D8 = 5.26 | N5 = 1.49171 | ν5 = 57.4 |

-continued

Embodiment 3 f = 100    FNo. = 1:2.8    2ω = 59°

R9 = −48.070

Aspheric Coefficients for the 8th Surface

| | |
|---|---|
| a1 = 0 | b1 = 0 |
| a2 = 1.244 × 10$^{-6}$ | b2 = 0 |
| a3 = 5.194 × 10$^{-9}$ | b3 = 0 |
| a4 = 3.326 × 10$^{-12}$ | b4 = 0 |
| a5 = 0 | |

As has been described in greater detail above, according to the present invention, the use of the focusing method by moving the 1st and 2nd components in a suitable speed ratio to effect focusing down to shorter object distances provides assurance that the changes of spherical abberation and field curvature take place in desirable directions throughout the focusing range and as a result the various aberrations can be well corrected in good balance for high grade impinging performance.

What we claim:

1. A photographic objective comprising from front to rear:

a first lens component having a positive refractive power convex toward the front;

a second lens component having a negative refractive power;

a third lens component having a positive refractive power;

a fourth lens component having a negative refractive power;

the first lens component moving forward and the second lens component moving rearward, when focusing on a close-up object, such as to satisfy the following condition:

$$0.5 < |\Delta 2/\Delta 1| < 3.5$$

in which Δ1 represents an amount of movement of the first lens component while Δ2 represents an amount of movement of the second lens component.

2. A photographic objective according to claim 1, wherein only the first and second lens components move at a time of focusing.

3. A photographic objective according to claim 2, wherein the fourth lens component includes a plurality of lens elements.

* * * * *